(12) United States Patent
Liao et al.

(10) Patent No.: US 12,043,699 B2
(45) Date of Patent: Jul. 23, 2024

(54) IMPACT-RESISTANT AND FLAME-RETARDANT POLYESTER MATERIAL

(71) Applicant: NAN YA PLASTICS CORPORATION, Taipei (TW)

(72) Inventors: Te-Chao Liao, Taipei (TW); Chun-Che Tsao, Taipei (TW); Wen-Jui Cheng, Taipei (TW); Yueh-Shin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/723,409

(22) Filed: Apr. 18, 2022

(65) Prior Publication Data
US 2023/0203241 A1    Jun. 29, 2023

(30) Foreign Application Priority Data
Dec. 29, 2021 (TW) .................................. 110149359

(51) Int. Cl.
| | |
|---|---|
| *C08G 63/183* | (2006.01) |
| *C08K 5/00* | (2006.01) |
| *C08K 7/14* | (2006.01) |
| *C08K 9/06* | (2006.01) |
| *C08L 67/02* | (2006.01) |

(52) U.S. Cl.
CPC ............ *C08G 63/183* (2013.01); *C08K 5/005* (2013.01); *C08K 5/0066* (2013.01); *C08K 5/0083* (2013.01); *C08K 7/14* (2013.01); *C08K 9/06* (2013.01); *C08L 67/02* (2013.01); *C08K 2201/011* (2013.01); *C08L 2201/02* (2013.01); *C08L 2205/025* (2013.01); *C08L 2205/03* (2013.01); *C08L 2207/20* (2013.01)

(58) Field of Classification Search
CPC .. C08G 63/183; C08K 5/0066; C08K 5/0083; C08K 7/14
See application file for complete search history.

(56) References Cited

U.S. PATENT DOCUMENTS

| | | | | |
|---|---|---|---|---|
| 5,277,864 A | * | 1/1994 | Blatz ....................... | B29C 45/46 525/176 |
| 9,714,340 B2 | * | 7/2017 | Yamamoto ............... | C08K 5/49 |
| 2009/0170985 A1 | | 7/2009 | Ai et al. | |
| 2013/0137797 A1 | * | 5/2013 | Onda ....................... | C08L 67/02 524/505 |
| 2017/0335054 A1 | * | 11/2017 | Kulkarni ................ | C08G 63/80 |

FOREIGN PATENT DOCUMENTS

| | | |
|---|---|---|
| CN | 101845205 | 9/2010 |
| CN | 103275468 | 9/2013 |
| CN | 106189126 | 12/2016 |
| CN | 106751794 | 5/2017 |
| CN | 107383806 | 11/2017 |
| CN | 107383807 | 11/2017 |
| CN | 110157164 | 8/2019 |
| JP | 2015218309 | 12/2015 |
| JP | 2019044037 | 3/2019 |
| JP | 2020533434 | 11/2020 |
| WO | 2007077794 | 7/2007 |

OTHER PUBLICATIONS

"Office Action of Taiwan Counterpart Application", issued on Nov. 29, 2022, p1-p10.
"Office Action of Japan Counterpart Application", issued on Aug. 29, 2023, p1-p7.
"Office Action of Taiwan Counterpart Application", issued on May 5, 2023, p1-p6.
"Office Action of Japan Counterpart Application", issued on Feb. 6, 2024, p1-p7.
"Office Action of China Counterpart Application", issued on May 18, 2024, p. 1-p. 6.

* cited by examiner

*Primary Examiner* — Ling Siu Choi
*Assistant Examiner* — Andrea Wu
(74) *Attorney, Agent, or Firm* — JCIPRNET

(57) ABSTRACT

The invention provides an impact-resistant and flame-retardant polyester material, which includes a PET resin, a nucleating agent, a flame retardant, an antioxidant, a rod-shaped filling and reinforcing material and a compatibilizer. The PET resin includes virgin pellets or environmental-friendly recycled pellets, which can meet the demand for the introduction of recycled materials.

10 Claims, No Drawings

IMPACT-RESISTANT AND FLAME-RETARDANT POLYESTER MATERIAL

CROSS-REFERENCE TO RELATED APPLICATION

This application claims the priority benefit of Taiwan application serial no. 110149359, filed on Dec. 29, 2021. The entirety of the above-mentioned patent application is hereby incorporated by reference herein and made a part of this specification.

BACKGROUND

Technical Field

The disclosure relates to a polyester material, and particularly relates to an impact-resistant and flame-retardant polyester material.

Description of Related Art

In the future, the market will gradually lead to the trend of circular economy, energy saving and carbon reduction. Under this market trend, the introduction of products with low-carbon recycled materials is an important goal of future industrial development. The introduction of recycled materials is based on the premise that the mechanical properties and processability are not affected, and the introduction of environmentally friendly recycled materials will help achieve the goal of reducing plastic and energy saving globally.

PET polyester material is the material with the most complete recycling industry chain among plastic materials, and its recycling sources include: plastic bottles, release films, industrial films, etc. Through solid-state polymerization and chain extension modification, the mechanical properties of recycled PET can be equivalent to virgin PET. However, its impact resistance, crystallization rate, rigidity (flexural modulus), and flame retardancy cannot meet the needs of high-end electronic and electrical products such as computer parts, office casings, and battery electrical casings.

Based on above-mentioned, developing an impact-resistant and flame-retardant polyester material which effectively improves impact resistance, crystallization rate, rigidity (flexural modulus) and flame retardancy is a target that are those skilled in the art eager to achieve.

SUMMARY

The disclosure provides an impact-resistant and flame-retardant polyester material, which improves a flame retardancy of PET materials through phosphorus-based and nitrogen-based flame retardants, so as to achieve halogen-free and non-toxic flame retardant products. Through a mixing and modification technology, problems of slow crystallization rate, insufficient impact strength and rigidity of PET materials can be improved, so that it can be used in electronic and electrical products such as computer parts, office cabinets, battery and electrical housings, connectors, etc.

An impact-resistant and flame-retardant polyester material according to the disclosure includes a PET resin, a nucleating agent, a flame retardant, an antioxidant, a rod-shaped filling and reinforcing material, and a compatibilizer.

In an embodiment of the disclosure, based on a total weight of the impact-resistant and flame-retardant polyester material, an added amount of the PET resin is 58 wt % to 72 wt %, an added amount of the nucleating agent is 0.5 wt % to 2 wt %, an added amount of the flame retardant is 10 wt % to 18 wt %, an added amount of the antioxidant is 0.1 wt % to 1 wt %, an added amount of the rod-shaped filling and reinforcing material is 10 wt % to 15 wt %, and an added amount of the compatibilizer is 3 wt % to 6 wt %.

In an embodiment of the disclosure, the PET resin includes virgin pellets or environmentally-friendly recycled pellets. A source of the environmentally-friendly recycled pellets may include recycled pellets for bottles, film materials, fabrics, or industrial recycled environmental-friendly polyester pellets (release film, etc.).

In an embodiment of the disclosure, an inherent viscosity (I.V.) of the PET resin is 0.55 to 1.0.

In an embodiment of the disclosure, the nucleating agent comprises an organic nucleating agent, an inorganic nucleating agent or a blend thereof.

In an embodiment of the disclosure, the organic nucleating agent comprises organic sodium salts, the organic sodium salts comprise sodium benzoate, sodium montanate or ethylene-methacrylic acid copolymer (EMAA).

In an embodiment of the disclosure, the inorganic nucleating agent comprises inorganic micro-nano powders, the inorganic micro-nano powders comprise talc, titanium dioxide, silica or calcium carbonate.

In an embodiment of the disclosure, the flame retardant is a halogen free flame retardant, the halogen free flame retardant comprises nitrogen flame retardant, phosphorus flame retardant or composite blends thereof.

In an embodiment of the disclosure, the antioxidant comprises a hindered phenol antioxidant, a phenol antioxidant, a hybrid antioxidant, a phosphite antioxidant, a compound antioxidant or a combination thereof.

In an embodiment of the disclosure, the rod-shaped filling and reinforcing material comprises siloxane-modified glass fibers.

In an embodiment of the disclosure, the compatibilizer comprises ethylene-methyl acrylate-glycidyl methacrylate copolymer (E-MA-GMA), polyolefin elastomer graft glycidyl methacrylate (POE-g-GMA), polyethylene graft glycidyl methacrylate glycerides (PE-g-GMA) or a combination thereof.

Based on the above, the disclosure provides an impact-resistant and flame-retardant polyester material, which improves a flame retardancy of PET materials through phosphorus-based and nitrogen-based flame retardants, so as to achieve halogen-free and non-toxic flame retardant products. Through a mixing and modification technology, problems of slow crystallization rate, insufficient impact strength and rigidity of PET materials can be improved, so that it can be used in electronic and electrical products such as computer parts, office cabinets, battery and electrical housings, connectors, etc. In addition, the PET material used in the disclosure can also be environmental-friendly recycled PET (PCR-PET) in addition to PET virgin resin, and its mechanical properties, flame retardant properties and processability are equivalent to virgin resin. Therefore, the requirement of importing recycled materials can be achieved.

DESCRIPTION OF THE EMBODIMENTS

Hereinafter, embodiments of the disclosure will be described in detail. However, these embodiments are illustrative, and the disclosure is not limited thereto.

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and a smaller numerical range thereof in the specification.

An impact-resistant and flame-retardant polyester material according to the disclosure includes a PET resin, a nucleating agent, a flame retardant, an antioxidant, a rod-shaped filling and reinforcing material, and a compatibilizer. Hereinafter, the above-mentioned components will be described in detail.

PET Resin

In the present embodiment, a PET resin may include virgin pellets or environmental-friendly recycled pellets, wherein a source of the environmental-friendly recycled pellets may include recycled pellets for bottles, film materials, fabrics, or industrial recycled environmental-friendly polyester pellets (release film, etc.), so as to achieve the requirement of importing recycled materials. However, the disclosure is not limited thereto. An inherent viscosity of the PET resin is 0.55 to 1.0, for example. Based on a total weight of the impact-resistant and flame-retardant polyester material, an added amount of the PET resin is 58 wt % to 72 wt %, for example.

Nucleating Agent

In the present embodiment, a nucleating agent may include an organic nucleating agent, an inorganic nucleating agent or a blend thereof. The organic nucleating agent may include organic sodium salts, and the organic sodium salts may include sodium benzoate, sodium montanate or ethylene-methacrylic acid copolymer (EMAA). The inorganic nucleating agent may include inorganic micro-nano powders, and the inorganic micro-nano powders may include talc, titanium dioxide, silica or calcium carbonate. Based on a total weight of the impact-resistant and flame-retardant polyester material, an added amount of the crystal nucleating agent is 0.5 wt % to 2 wt %, preferably 1 wt % to 1.5 wt %, for example. Adding the nucleating agent can increase the crystallization and solidification rate of PET material, thereby improving its processability.

Flame Retardant

In the present embodiment, in order to meet the requirement of RoHS and halogen free for product, a flame retardant is a halogen free flame retardant. The halogen free flame retardant may include a nitrogen flame retardant, a phosphorus flame retardant or composite blends thereof. The phosphorus flame retardant may include pentaerythritol bisphosphate melamine salt (MPP), ammonium polyphosphate (APP), toluene xylyl phosphate or hypophosphite. The nitrogen flame retardant may include melamine cyanurate (MCA), melamine, etc. More particularly, the compound effect of hypophosphite and melamine cyanurate (MCA) is better. The ratio of hypophosphite to melamine cyanurate (MCA) is 4:1 to 1:1, and the best ratio is 2:1, for example. Based on a total weight of the impact-resistant and flame-retardant polyester material, an added amount of the flame retardant is 10 wt % to 18 wt %, for example. The flame retardant can inhibit the combustion of PET through carbonization on the surface and improve the flame retardant properties.

Antioxidant

In the present embodiment, an antioxidant may include a hindered phenol antioxidant, a phenol antioxidant, a hybrid antioxidant, a phosphite antioxidant, a compound antioxidant or a combination thereof. Based on a total weight of the impact-resistant and flame-retardant polyester material, an added amount of the antioxidant is 0.1 wt % to 1 wt %, for example. The antioxidant can improve the heat resistance and processability of the material.

Rod-Shaped Filling and Reinforcing Material

In the present embodiment, rod-shaped filling and reinforcing material may include siloxane-modified glass fibers. The surface is modified with siloxane to improve the compatibility. A diameter of the glass fiber is 10 μm to 13 μm, and a length of a cut strand is 3 mm to 4 mm, for example. Based on a total weight of the impact-resistant and flame-retardant polyester material, an added amount of the rod-shaped filling and reinforcing material is 10 wt % to 15 wt %, for example. The rod-shaped filling and reinforcing material can effectively improve the impact strength and rigidity of the material, and the improvement effect of physical properties is directly related to the dispersion degree of the rod-shaped reinforcing material. Therefore, it is necessary to simultaneously introduce a compatibilizer grafted with GMA to improve the rod-shaped filling and reinforcing material dispersibility in PET.

Compatibilizer

In the present embodiment, a compatibilizer may include ethylene-methyl acrylate-glycidyl methacrylate copolymer (E-MA-GMA), polyolefin elastomer graft glycidyl methacrylate (POE-g-GMA), polyethylene graft glycidyl methacrylate glycerides (PE-g-GMA) or a combination thereof. Based on a total weight of the impact-resistant and flame-retardant polyester material, an added amount of the compatibilizer is 3 wt % to 6 wt %, for example. The compatibilizer can improve the compatibility between rod-shaped filling and reinforcing material and PET resin to improve the material reinforcement effect.

A reforming process of impact-resistant and flame-retardant polyester material in the disclosure includes the following steps. First, the PET resin, the nucleating agent, the antioxidant and the compatibilizer are added to the extruder at the main feed temperature of 230° C. to 250° C. After that, the flame retardant is added to the extruder at a feed temperature of 250° C. to 270° C. Next, the rod-shaped filling and reinforcing material is added into the extruder at a feed temperature of 255° C. to 275° C. Finally, at a vacuum temperature of 245° C. to 265° C., the impact-resistant and flame-retardant polyester material of the disclosure can be made.

Below, the above-mentioned impact-resistant and flame-retardant polyester material of the disclosure is described in detail by experimental example. However, the following experimental examples are not intended to limit the disclosure.

Experimental Examples

In order to prove that the polyester composition proposed by the disclosure has excellent mechanical properties, and can further have good flame retardant properties, this experimental example is specially performed below.

Test Methods

Specific gravity: ASTM D792
Tensile strength, elongation: ASTM D638
Bending strength, bending modulus: ASTM D790
Flame retardant: UL94

Material Property Evaluation

PC+ABS for computer parts, an unmodified PET, a 15% glass fiber reinforced PET without flame retardant modification (PET+15% GF) and the impact-resistant and flame-retardant polyester material of the disclosure are tested by the above test methods, and the test results are listed in Table 1 below. In Table 1, the impact-resistant and flame-retardant polyester material of the disclosure includes 63.7 wt % PET resin, 1 wt % crystal nucleating agent, 15 wt % flame retardant, 0.3 wt % antioxidant, 15 wt % rod-shaped filling and reinforcing material and 5 wt % compatibilizer.

As shown in Table 1, compared to the unmodified PET and 15% glass fiber reinforced PET without flame retardant modification (PET+15% GF), the impact-resistant and flame-retardant polyester material of the disclosure has the same flame retardant properties as PC+ABS for computer parts, and also has good mechanical properties.

TABLE 1

| | | PC + ABS for computer parts | Unmodified PET | PET + 15% GF | Impact-resistant and flame-retardant polyester material of the disclosure |
|---|---|---|---|---|---|
| Mechanical properties | Specific gravity | 1.29 | 1.35 | 1.43 | 1.42 |
| | Impact strength (kg-cm/cm) | 6 | 3.5 | 5 | 5.3 |
| | Tensile strength (MPa) | 67 | 60 | 75 | 72.1 |
| | Elongation (%) | 3.8 | 5.2 | 3.1 | 2.9 |
| | Bending strength (MPa) | 108 | 88 | 100 | 118.8 |
| | Bending modulus (MPa) | 4,600 | 2,400 | 5,000 | 5,080 |
| Flame retardant properties | UL94 flame retardant | 1.0 mm V0 | HB | HB | 1.0 mm V0 |

In summary, the impact-resistant and flame-retardant polyester material of the disclosure includes additives such as flame retardant, nucleating agent and rod-shaped filling and reinforcing material. Adding nucleating agent can increase the crystallization and solidification rate of PET material, thereby improving its processability. The flame retardant can inhibit the combustion of PET through carbonization on the surface and improve the flame retardant properties. The rod-shaped filling and reinforcing material can effectively improve the impact strength and rigidity of the material, wherein the effect of physical property improvement is directly related to the degree of dispersion of the rod-shaped reinforcing material. Therefore, it is necessary to simultaneously introduce a -GMA-grafted compatibilizer to improve the rod-shaped reinforcing material. The antioxidant can improve the heat resistance and processability of the material. In this way, the problems of slow crystallization rate, insufficient impact strength and rigidity of PET material can be effectively improved, so that it can be used in electronic and electrical products such as computer parts, office cabinets, battery and electrical housings, connectors, etc. by injection molding. Furthermore, in addition to PET virgin pellets, the PET materials used in the disclosure can also be imported into environmental-friendly recycled PET (PCR-PET), and the mechanical properties, flame retardant properties and processability are equivalent to virgin pellets. As a result, the demand for the introduction of recycled materials can be achieved, and it is more in line with the trend of circular economy.

What is claimed is:

1. An impact-resistant and flame-retardant polyester material, comprising:
   a PET resin;
   a nucleating agent;
   a flame retardant;
   an antioxidant;
   a rod-shaped filling and reinforcing material; and
   a compatibilizer,
   wherein the flame retardant is a halogen free flame retardant, the halogen free flame retardant comprises mixtures of nitrogen flame retardant and phosphorus flame retardant,
   the nitrogen flame retardant is melamine cyanurate (MCA), the phosphorus flame retardant is hypophosphite, and a weight ratio of hypophosphite to melamine cyanurate (MCA) is 4:1 to 1:1.

2. The impact-resistant and flame-retardant polyester material according to claim 1, wherein based on a total weight of the impact-resistant and flame-retardant polyester material, an added amount of the PET resin is 58 wt % to 72 wt %, an added amount of the nucleating agent is 0.5 wt % to 2 wt %, an added amount of the flame retardant is 10 wt % to 18 wt %, an added amount of the antioxidant is 0.1 wt % to 1 wt %, an added amount of the rod-shaped filling and reinforcing material is 10 wt % to 15 wt %, and an added amount of the compatibilizer is 3 wt % to 6 wt %.

3. The impact-resistant and flame-retardant polyester material according to claim 1, wherein the PET resin comprises virgin pellets or environmental-friendly recycled pellets.

4. The impact-resistant and flame-retardant polyester material according to claim 1, wherein an inherent viscosity of the PET resin is 0.55 to 1.0.

5. The impact-resistant and flame-retardant polyester material according to claim 1, wherein the nucleating agent comprises an organic nucleating agent, an inorganic nucleating agent or a blend thereof.

6. The impact-resistant and flame-retardant polyester material according to claim 5, wherein the organic nucleating agent comprises organic sodium salts, the organic sodium salts comprise sodium benzoate, or sodium montanate.

7. The impact-resistant and flame-retardant polyester material according to claim 5, wherein the inorganic nucleating agent comprises inorganic micro-nano powders, the inorganic micro-nano powders comprise talc, titanium dioxide, silica or calcium carbonate.

8. The impact-resistant and flame-retardant polyester material according to claim 1, wherein the antioxidant comprises a hindered phenol antioxidant, a phenol antioxidant, a hybrid antioxidant, a phosphite antioxidant, or a combination thereof.

9. The impact-resistant and flame-retardant polyester material according to claim 1, wherein the rod-shaped filling and reinforcing material comprises siloxane-modified glass fibers.

10. The impact-resistant and flame-retardant polyester material according to claim 1, wherein the compatibilizer comprises ethylene-methyl acrylate-glycidyl methacrylate copolymer (E-MA-GMA), polyolefin elastomer graft glycidyl methacrylate (POE-g-GMA), polyethylene graft glycidyl methacrylate glycerides (PE-g-GMA) or a combination thereof.

\* \* \* \* \*